US011291039B2

United States Patent
Han et al.

(10) Patent No.: US 11,291,039 B2
(45) Date of Patent: Mar. 29, 2022

(54) WIRELESS NETWORK ACCESS CONTROL METHOD AND APPARATUS

(71) Applicant: HUAWEI TECHNOLOGIES CO., LTD., Shenzhen (CN)

(72) Inventors: Feng Han, Shanghai (CN); Hong Li, Shanghai (CN); Yinghao Jin, Shanghai (CN); Wenqi Sun, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 47 days.

(21) Appl. No.: 16/271,865

(22) Filed: Feb. 10, 2019

(65) Prior Publication Data

US 2019/0174536 A1 Jun. 6, 2019

Related U.S. Application Data

(63) Continuation of application No. PCT/CN2017/097418, filed on Aug. 14, 2017.

(30) Foreign Application Priority Data

Aug. 12, 2016 (CN) .......................... 201610667792.7

(51) Int. Cl.
*H04W 74/00* (2009.01)
*H04W 74/08* (2009.01)

(52) U.S. Cl.
CPC ..... *H04W 74/002* (2013.01); *H04W 74/0833* (2013.01)

(58) Field of Classification Search
CPC .................. H04W 74/002; H04W 74/0833
See application file for complete search history.

(56) References Cited

U.S. PATENT DOCUMENTS 8,767,553 B2 7/2014 Kokku et al.
2013/0279330 A1 10/2013 Feng et al.
(Continued)

FOREIGN PATENT DOCUMENTS

CN 101459928 6/2009
CN 101541040 A 9/2009
(Continued)

OTHER PUBLICATIONS

SK Telecom,"End-to-End Network Slicing Requirements for Next Generation Access Technologies",3GPP TSG RAN ad-hoc RPa-160048,Jan. 28-29, 2016—Barcelona, Spain,total 3 pages.
(Continued)

*Primary Examiner* — Luat Phung
(74) *Attorney, Agent, or Firm* — Fish & Richardson P.C.

(57) ABSTRACT

The present invention discloses a wireless network access control method and an apparatus. The method includes: configuring, by a wireless network, an independent access control parameter for each network slice, so as to implement differential access control, by the network, on access to different network slices that is initiated by a terminal device. In addition, a core network or a radio access network initiates network slice overload control or a network slice access control parameter adjustment based on resource usage of each network slice in the network. By separately controlling and adjusting the access control parameter of each network slice, it is ensured that impact between network slices is minimized.

8 Claims, 9 Drawing Sheets

(56) References Cited

U.S. PATENT DOCUMENTS

| | | | |
|---|---|---|---|
| 2013/0303114 A1 | 11/2013 | Ahmad et al. | |
| 2016/0156513 A1 | 6/2016 | Zhang et al. | |
| 2017/0079059 A1* | 3/2017 | Li | H04W 16/02 |
| 2018/0124854 A1* | 5/2018 | Myhre | H04W 76/10 |
| 2018/0352501 A1* | 12/2018 | Zhang | H04W 48/14 |
| 2018/0376407 A1* | 12/2018 | Myhre | H04W 48/16 |
| 2019/0313473 A1* | 10/2019 | Kim | H04W 74/08 |

FOREIGN PATENT DOCUMENTS

| | | |
|---|---|---|
| CN | 101860488 A | 10/2010 |
| CN | 102111847 | 6/2011 |
| CN | 102469519 | 5/2012 |
| CN | 102547914 | 7/2012 |
| CN | 102740493 | 10/2012 |
| CN | 104219167 A | 12/2014 |
| EP | 2645779 A1 | 10/2013 |
| EP | 2265054 B1 | 9/2017 |

OTHER PUBLICATIONS

3GPP TR 33.899 V0.34.0 (Jul. 8, 2016);3rd Generation Partnership Project;Technical Specification Group Services and System Aspects;Study on the security aspects of the next generation system(Release 14);total 156 pages.

Xun Hu et al.,"A joint utility optimization based virtual AP and network slice selection scheme for SDWNs",2015 10th International Conference on Communications and Networking in China (ChinaCom) ,total 6 pages.

RAN WG3 Meeting #92, R3-161134, Huawei"Network slice selection", New Radio, Nanjing, China, May 23-27, 2016. 4 pages.

RAN WG3 Meeting #92, R3-161135,Huawei:"RAN configuration of network slices", Nanjing, China, May 23-27, 2016. 5 pages.

Xu Yang et al., "Initial Analysis of 5G Mobile Network Slicing Technology", Designing Techniques of Posts and Telecommunications, 2016, total 4 pages.

Huawei, HiSilicon, "UE Slice Association/Overload control Procedure", 3GPP TSG SA WG2 Meeting #115 S2-162605 (revision of S2-16xxxx), May 23-27, 2016, Nanjing, China, total 8 pages.

"5G Network Architecture Design White Paper",IMT-2020 (5G) ,with an English translation,with an English translation, total 36 pages.

Icaro da Silva et al., "Impact of Network Slicing on 5G Radio Access Networks", EuCNC2016-BusAsp 1570257560, total 5 pages.

3GPP TR 23.799 V0.7.0 (Aug. 2016); 3rd Generation Partnership Project;Technical Specification Group Services and System Aspects; Study on Architecture for Next Generation System(Release 14), total 323 pages.

ZTE, "Key hierarchy schems for network silcing", 3GPP TSG SA WG3 (Security) Meeting #84 S3-160965, Jul. 25-29, 2016 Chennai (India), total 6 pages.

Ericsson, "RAN support for network slicing", 3GPP TSG-RAN WG2 #93bis Tdoc R2-162758, Dubrovnik, Croatia, Apr. 11-15, 2016, total 3 pages.

Ericsson, RAN support for network slicing. 3GPP TSG-RAN WG2 #94, Nanjing, PRC, May 23-27, 2016, R2-164004, 4 pages.

* cited by examiner

WIRELESS NETWORK ACCESS CONTROL METHOD AND APPARATUS

CROSS-REFERENCE TO RELATED APPLICATIONS

This application is a continuation of International Application No. PCT/CN2017/097418, filed on Aug. 14, 2017, which claims priority to Chinese Patent Application No. 201610667792.7, filed on Aug. 12, 2016. The disclosures of the aforementioned applications are hereby incorporated by reference in their entireties.

TECHNICAL FIELD

The present invention relates to the field of wireless network communications, and in particular, to a wireless network access control method and an apparatus.

BACKGROUND

With the rapid development of wireless communication technologies, the 5th generation (5G) wireless communication technology has become a hot spot in the industry. 5G will support diverse application requirements, including an access capability supporting higher-speed experience and larger bandwidth, information interaction with a lower delay and high reliability, access and management of larger-scale and low-cost machine type communication devices, and the like. In addition, 5G will support application scenarios for various vertical industries such as the Internet of Vehicles, emergency communications, and the industrial Internet. For these 5G performance requirements and application scenarios, a 5G network needs to be closer to user-specific requirements, and a customization capability of the 5G network needs to be further improved.

In view of this, 5G introduces an important concept: network slice. A network slice is a combination of network functions (NFs) implementing a communication service and a network capability and corresponding resource requirements, and includes a core network (CN) part, a radio access network (RAN) part, and a user equipment (UE) part. A network slice forms an end-to-end logical network to meet a performance requirement of one or more network services of a slice demand side. One RAN can support a plurality of network slices. For example, one RAN can support a plurality of vertical industry applications. Different network slices usually have different performance requirements. For example, machine type communications (MTC) require that a network can access a large quantity of connections, and ultra-reliable and low-latency communications (URLLC) require an extremely low delay. Therefore, the RAN needs to treat different network slices differently, and even needs to implement differential processing of quality of service (QoS) within a network slice. In addition, the RAN needs to ensure that impact between network slices is minimized. For example, when resources of a network slice become congested because the network slice corresponds to a large quantity of user access demands or because service traffic rises, performance of another network slice that works normally is not affected. In addition, one UE may separately access different network slices or simultaneously access a plurality of different network slices based on service requirements. When accessing a network, the UE also needs to consider different requirements of different network slices.

An access control method of a conventional cellular network is implemented based on an access class or a service type class of UE, and cannot provide differential access control for different network services. The 5G network needs to provide differential network access control for different network slices. How to perform wireless network access control for different network slices has not been properly addressed yet.

SUMMARY

Embodiments of the present invention provide a wireless network access control method and an apparatus, so as to provide corresponding access control methods for different network slices.

According to a first aspect, an embodiment of the present invention provides a wireless network access control method. The method includes: setting, by a radio access network device, an access control parameter of one or more network slices, where the access control parameter includes an identifier of the one or more network slices; and sending, by the radio access network device, the access control parameter to a terminal device.

With reference to the first aspect, in a first possible implementation of the first aspect, the access control parameter includes at least one of the following: an access class control parameter, a random access channel resource, an RRC connection rejection message or an RRC connection release message, and an RRC wait time.

With reference to the first aspect, in a second possible implementation of the first aspect, the radio access network device broadcasts the access control parameter to the terminal device through a system information, where the system information includes an access class control parameter of the one or more network slices and/or a random access channel resource of the one or more network slices.

With reference to the first aspect, in a third possible implementation of the first aspect, the radio access network device sends the access control parameter to the terminal device through a unicast message, where the unicast message is an RRC connection rejection message or an RRC connection release message.

With reference to the first possible implementation of the first aspect, in a fourth possible implementation of the first aspect, the access class control parameter includes at least one of the following: an access class barring factor, an access class barring time, an access permission bit identifier, and an application type category; the random access channel resource includes a random access preamble sequence set and/or a random access time-frequency resource; and the RRC connection rejection message or the RRC connection release message includes at least one of the following: an RRC wait time and a specific cause identifier with the RRC wait time.

With reference to the first aspect, in a fifth possible implementation of the first aspect, the access control parameter further includes a PLMN identifier.

According to a second aspect, an embodiment of the present invention provides a radio access network device. The radio access network device includes a communications interface and a processor. The communications interface is configured to send an access control parameter to a terminal. The access control parameter includes an identifier of one or more network slices. The processor is configured to set the access control parameter of the one or more network slices.

With reference to the second aspect, in a first possible implementation of the second aspect, the access control parameter includes at least one of the following: an access class control parameter, a random access channel resource, an RRC connection rejection message or an RRC connection release message, and an RRC wait time.

With reference to the second aspect, in a second possible implementation of the second aspect, the communications interface broadcasts the access control parameter to the terminal device through a system information, where the system information includes an access class control parameter of the one or more network slices and/or a random access channel resource of the one or more network slices.

With reference to the second aspect, in a third possible implementation of the second aspect, the communications interface sends the access control parameter to the terminal device through a unicast message, where the unicast message is an RRC connection rejection message or an RRC connection release message.

With reference to the first possible implementation of the second aspect, in a fourth possible implementation of the second aspect, the access class control parameter includes at least one of the following: an access class barring factor, an access class barring time, an access permission bit identifier, and an application type category; the random access channel resource includes a random access preamble sequence set and/or a random access time-frequency resource; and the RRC connection rejection message or the RRC connection release message includes at least one of the following: an RRC wait time and a specific cause identifier with the RRC wait time.

With reference to the second aspect, in a fifth possible implementation of the second aspect, the access control parameter further includes a PLMN identifier.

According to a third aspect, an embodiment of the present invention provides a wireless network access control method. The method includes: collecting, by a core network device, statistics about resource usage of each network slice, and triggering, based on a load status of each network slice, a radio access network to adjust an access control parameter of a network slice.

With reference to the third aspect, in a first possible implementation of the third aspect, the core network device collects statistics about resource usage of each network slice, and when determining to perform overload control, the core network device sends an overload control indication to a radio access network device. The overload control indication includes an identifier of one or more overloaded network slices.

With reference to the third aspect, in a second possible implementation of the third aspect, the core network device collects statistics about resource usage of each network slice, and when determining to terminate overload control, the core network device sends an overload control termination indication to a radio access network device. The overload control termination indication includes an identifier of one or more network slices in which overload has been eliminated.

With reference to the third aspect, in a third possible implementation of the third aspect, the core network device collects statistics about resource usage of each network slice, and when determining to perform an access control parameter adjustment, the core network device sends an access control adjustment indication to a radio access network device. The access control adjustment indication includes an identifier of one or more network slices whose access control parameters need to be adjusted.

According to a fourth aspect, an embodiment of the present invention provides a core network device. The core network device includes a communications interface and a processor. The communications interface is configured to send an overload control indication, an overload control termination indication, an access control adjustment indication, and the like to a radio access network device. The overload control indication, the overload control termination indication, or the access control adjustment indication includes an identifier of one or more network slices. The processor is configured to: collect statistics about resource usage of each network slice, and determines to perform overload control, perform overload control termination, or adjust an access control parameter.

With reference to the fourth aspect, in a first possible implementation of the fourth aspect, the core network device collects statistics about resource usage of each network slice, and when one or more network slices are overloaded, the core network device sends an overload control indication to the radio access network device. The overload control indication includes an identifier of the one or more overloaded network slices.

With reference to the fourth aspect, in a second possible implementation of the fourth aspect, the core network device collects statistics about resource usage of each network slice, and when overload in one or more network slices is eliminated, the core network device sends an overload control termination indication to the radio access network device. The overload control termination indication includes a slice identifier of the one or more overloaded network slices in which overload has been eliminated.

With reference to the fourth aspect, in a third possible implementation of the fourth aspect, the core network device collects statistics about resource usage of each network slice, and when an access control parameter of one or more network slices needs to be adjusted, the core network device sends an access control adjustment indication to the radio access network device. The access control adjustment indication includes a slice identifier of the one or more network slices whose access control parameters need to be adjusted.

According to a fifth aspect, an embodiment of the present invention provides a wireless network access control method. The method includes: collecting, by a core network device, statistics about resource usage of each network slice, and triggering, based on a load status of each network slice, a radio access network device to adjust an access control parameter of a network slice, so that the radio access network device adjusts the access control parameter based on an indication of the core network device.

With reference to the fifth aspect, in a first possible implementation of the fifth aspect, the core network device collects statistics about resource usage of each network slice, and when determining to perform overload control, the core network device sends an overload control indication to a radio access network device. The overload control indication includes an identifier of one or more overloaded network slices.

With reference to the fifth aspect, in a second possible implementation of the fifth aspect, the core network device collects statistics about resource usage of each network slice, and when determining to terminate overload control, the core network device sends an overload control termination indication to a radio access network device. The overload control termination indication includes an identifier of one or more network slices in which overload has been eliminated.

With reference to the fifth aspect, in a third possible implementation of the fifth aspect, the core network device collects statistics about resource usage of each network slice, and when determining to perform an access control parameter adjustment, the core network device sends an access control adjustment indication to a radio access network device. The access control adjustment indication includes an identifier of one or more network slices whose access control parameters need to be adjusted.

With reference to the first possible implementation of the fifth aspect, in a fourth possible implementation of the fifth aspect, the radio access network device receives the overload control indication sent by the core network device, and adjusts an access control parameter of the overloaded network slice.

With reference to the second possible implementation of the fifth aspect, in a fifth possible implementation of the fifth aspect, the radio access network device receives the overload control termination indication sent by the core network device, and restores a default access control parameter of the network slice in which overload has been eliminated.

With reference to the third possible implementation of the fifth aspect, in a sixth possible implementation of the fifth aspect, the radio access network device receives the access control adjustment indication sent by the core network device, and adjusts the access control parameter.

With reference to any one of the foregoing possible implementations of the fifth aspect, in a seventh possible implementation of the fifth aspect, the radio access network device sends an adjusted access control parameter or the restored access control parameter to a terminal device, and the access control parameter includes the network slice identifier of the one or more network slices.

With reference to the seventh possible implementation of the fifth aspect, in an eighth possible implementation of the fifth aspect, the access control parameter includes at least one of the following: an access class control parameter, a random access channel resource, an RRC connection rejection message or an RRC connection release message, and an RRC wait time.

With reference to the seventh possible implementation of the fifth aspect, in a ninth possible implementation of the fifth aspect, the radio access network device broadcasts the access control parameter to the terminal device through a system information, where the system information includes an access class control parameter of the one or more network slices and/or a random access channel resource of the one or more network slices.

With reference to the seventh possible implementation of the fifth aspect, in a tenth possible implementation of the fifth aspect, the radio access network device sends the access control parameter to the terminal device through a unicast message, where the unicast message is an RRC connection rejection message or an RRC connection release message.

With reference to the eighth possible implementation of the fifth aspect, in an eleventh possible implementation of the fifth aspect, the access class control parameter includes at least one of the following: an access class barring factor, an access class barring time, an access permission bit identifier, and an application type category; the random access channel resource includes a random access preamble sequence set and/or a random access time-frequency resource; and the RRC connection rejection message or the RRC connection release message includes at least one of the following: an RRC wait time and a specific cause identifier with the RRC wait time.

With reference to the seventh possible implementation of the fifth aspect, in a twelfth possible implementation of the fifth aspect, the access control parameter further includes a PLMN identifier.

According to a sixth aspect, an embodiment of the present invention provides a wireless network access control method. The method includes: collecting, by a radio access network device, statistics about resource usage of each network slice, and adjusting an access control parameter of a network slice based on a load status of each network slice.

With reference to the sixth aspect, in a first possible implementation of the sixth aspect, the radio access network device collects statistics about resource usage of each network slice, and when determining to perform overload control, the radio access network device adjusts an access control parameter of an overloaded network slice. The access control parameter includes an identifier of one or more overloaded network slices.

With reference to the sixth aspect, in a second possible implementation of the sixth aspect, the radio access network device collects statistics about resource usage of each network slice, and when determining to perform overload control termination, the radio access network device restores a default access control parameter of a network slice in which overload has been eliminated. The access control parameter includes an identifier of one or more network slices in which overload has been eliminated.

With reference to the sixth aspect, in a third possible implementation of the sixth aspect, the radio access network device collects statistics about resource usage of each network slice, and when determining to perform an access control parameter adjustment, the radio access network device adjusts an access control parameter of a network slice. The access control parameter includes an identifier of one or more network slices.

With reference to any one or the foregoing possible implementations of the sixth aspect, in a fourth possible implementation of the sixth aspect, the access control parameter includes at least one of the following: an access class control parameter, a random access channel resource, an RRC connection rejection message or an RRC connection release message, and an RRC wait time.

With reference to the fourth possible implementation of the sixth aspect, in a fifth possible implementation of the sixth aspect, the radio access network device broadcasts the access control parameter to a terminal device through a system information, where the system information includes an access class control parameter of the one or more network slices and/or a random access channel resource of the one or more network slices.

With reference to the fourth possible implementation of the sixth aspect, in a sixth possible implementation of the sixth aspect, the radio access network device sends the access control parameter to the terminal device through a unicast message, where the unicast message is an RRC connection rejection message or an RRC connection release message.

With reference to the fifth possible implementation of the sixth aspect, in a seventh possible implementation of the sixth aspect, the access class control parameter includes at least one of the following: an access class barring factor, an access class barring time, an access permission bit identifier, and an application type category; the random access channel resource includes a random access preamble sequence set and/or a random access time-frequency resource; and the RRC connection rejection message or the RRC connection release message includes at least one of the following: an RRC wait time and a specific cause identifier with the RRC wait time.

With reference to the fourth possible implementation of the sixth aspect, in an eighth possible implementation of the sixth aspect, the access control parameter further includes a PLMN identifier.

In the embodiments of the present invention, the wireless network configures an independent access control parameter for each network slice, where the control parameter includes an identifier of one or more network slices, so as to implement differential access control, by the network, on access to different network slices that is initiated by the terminal device. In addition, the core network or the radio access network initiates network slice overload control or a network slice access control parameter adjustment based on resource usage of each network slice in the network. By separately controlling and adjusting the access control parameter of each network slice, it is ensured that impact between network slices is minimized.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
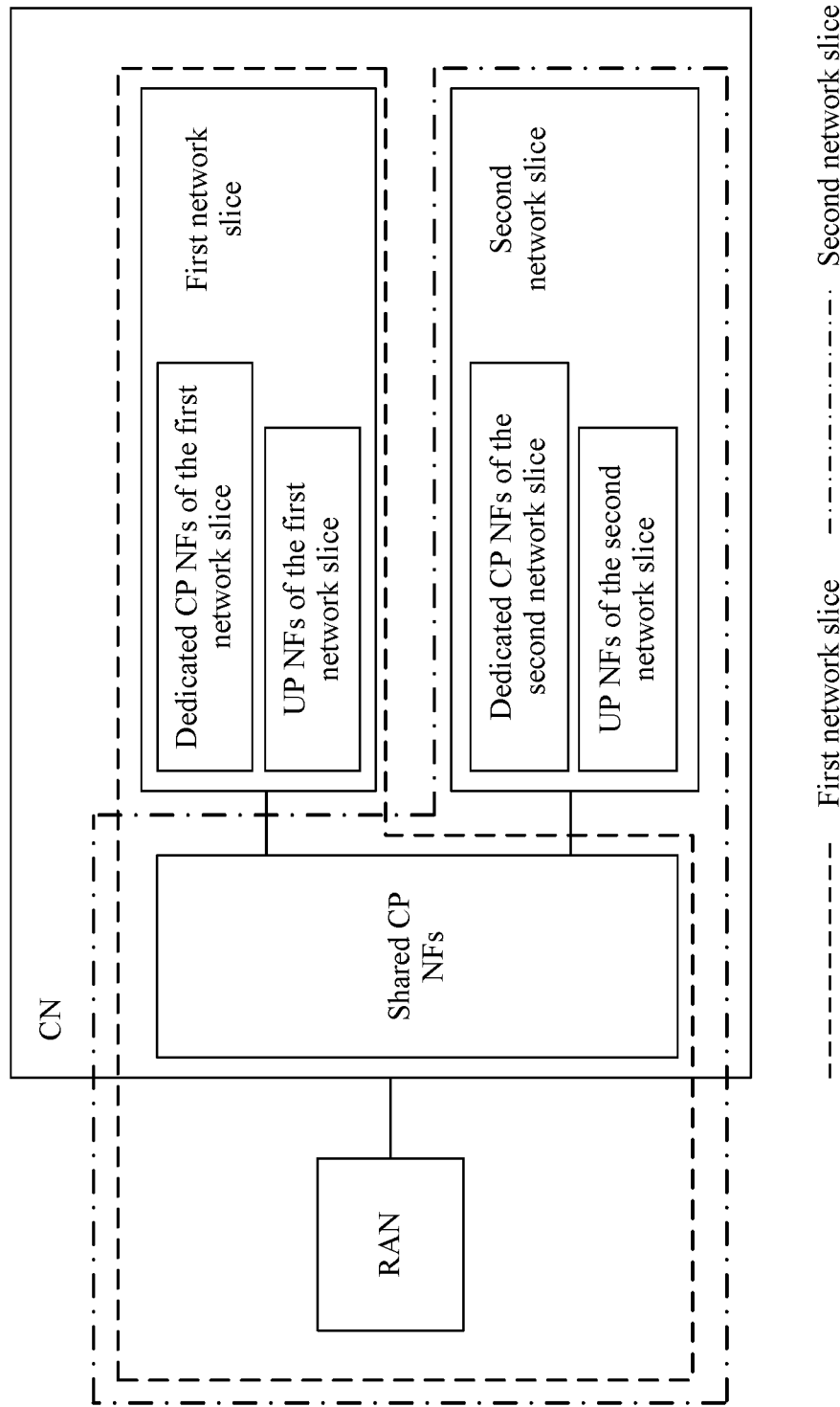
FIG. 1 is an architectural diagram of a network slice on a network side according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. The following specific embodiments may be mutually combined, and same or similar concepts or processes may not be repeatedly described in some embodiments. All other embodiments obtained by a person of ordinary skill in the art based on the embodiments of the present invention without creative efforts shall fall within the protection scope of the present invention.

To enable any person skilled in the art to implement and use the present invention, the following description is provided. In the following description, details are set forth for the purpose of explanation. It should be understood by a person of ordinary skill in the art that the present invention can be implemented without these specific details. In other instances, well-known structures and processes are not described in detail in order to avoid obscuring the description of the present invention with unnecessary detail. Therefore, the present invention is limited to the embodiments described in this specification but extends to the widest scope that complies with the principles and novelty disclosed in this specification.

In the specification, claims, and accompanying drawings of the present invention, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes technical solutions of the present invention in detail by using specific embodiments. The following specific embodiments may be mutually combined, and same or similar concepts or processes may not be repeatedly described in some embodiments.

The wireless network access control method and the apparatus provided in the embodiments of the present invention are applicable to access control between UE and a wireless network, particularly network access control for UE supporting one or more slices. A network slice architecture may include UE, an RAN, and a CN. Network functions (network functions, NFs for short) of a network slice in the CN includes NFs of a control plane (CP) and NFs of a user plane (UP). CP NFs are used for functions such as mobility management and session management, for example, UE access, tracking area update, and handover. UP NFs are used for data transmission of UE. All network slices in the CN share an RAN resource. Generally, a network can simultaneously support communication of a plurality of network slices. The network allocates a corresponding network resource to each network slice to ensure QoS of communication of each network slice. The UE implements a communication function by establishing connections to the RAN and the CN. In addition, one UE can simultaneously support communication with one or more network slices.

Figure 2:
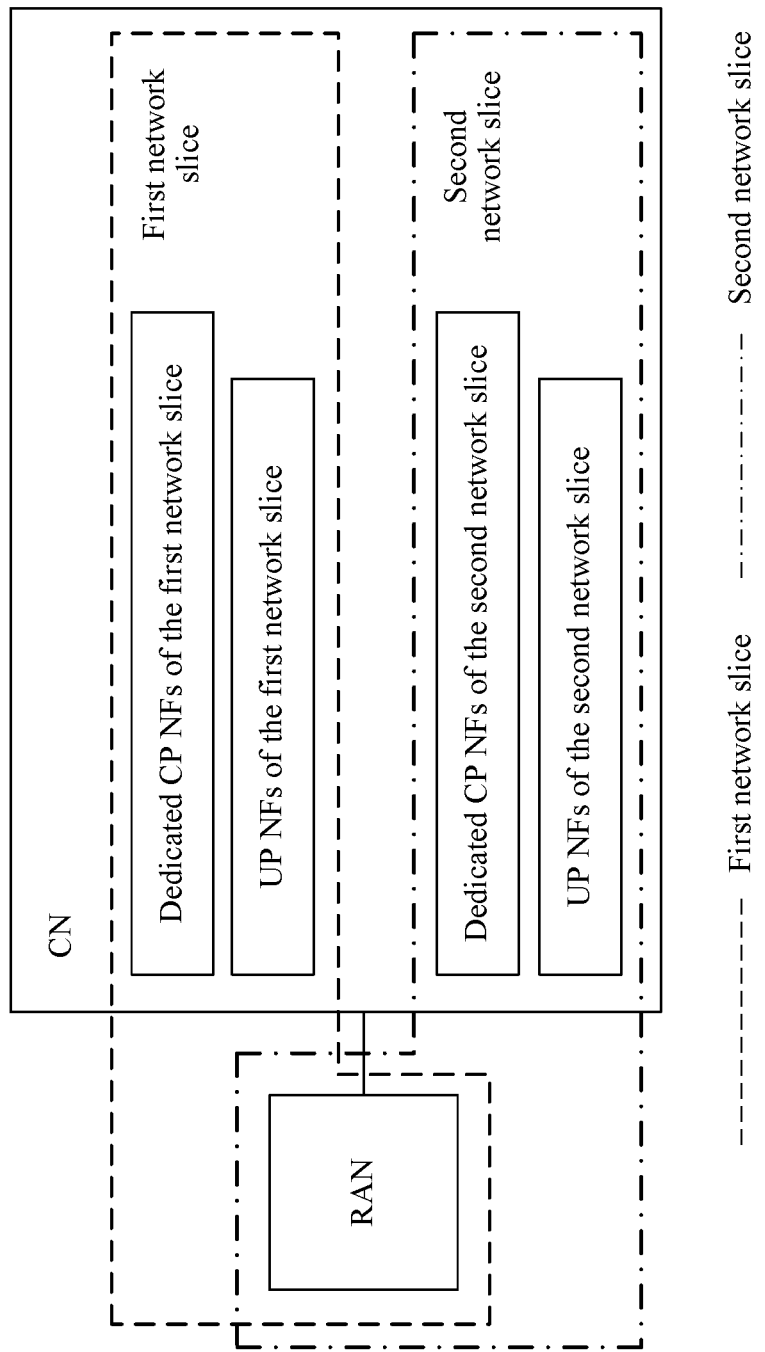
FIG. 2 is an architectural diagram of a network slice on a network side according to another embodiment of the present invention.

FIG. 1 shows an architectural diagram of a network slice on a network side according to an embodiment of the present invention. A plurality of network slices on a CN side have both shared CP NFs and respective dedicated CP NFs. Each network slice has respective dedicated UP NFs. For example, a first network slice and a second network slice in FIG. 1 each have both shared CP NFs and respective dedicated CP NFs, and UP NFs of the first network slice and UP NFs of the second network slice are respectively dedicated to the first network slice and the second network slice. FIG. 2 shows an architectural diagram of another network slice on a network side according to an embodiment of the present invention. Both CP NFs and UP NFs of each network slice on a CN side are dedicated. For example, CP NFs and UP NFs of a first network slice and CP NFs and UP NFs of a second network slice in FIG. 2 are respectively dedicated to the first network slice and the second network slice. In FIG. 1 and FIG. 2, a dashed line " — — — — " indicates CN NFs and a shared RAN that are included in the first network slice, and a dash-dotted line " — · — · — " indicates CN NFs and the shared RAN that are included in the second network slice.

In the embodiments of the present invention, to provide differential network access control, the wireless network is configured to perform independent access control for each network slice based on network resource usage and network process policies of different network slices, for example, based on a comparison of resource requirements of the different network slices with resources allocated by the network to the network slices, and priority policies set by the network for the different network slices. Specifically, the wireless network may perform slice identifier-based access control. When the UE accesses one or more network slices, an identifier of the one or more network slices is carried. The wireless network implements access control of the UE based on the identifier of the one or more network slices and a corresponding network slice access control parameter. Further, when one or more network slices in the network are overloaded, the wireless network adjusts an access control parameter of the one or more overloaded network slices through overload control, so as to implement dynamic access control of the UE. The following gives description by using specific embodiments.

Embodiment 1

This embodiment provides a method for performing, by a wireless network, independent access control for different network slices. In this embodiment of the present invention, the wireless network is configured with an independent access class control parameter for each network slice in the network based on network resource usage and network process policies of different network slices, and an RAN is configured to broadcast the access class control parameter of one or more network slices to UE through a system information. The access class control parameter of the network slice may include an identifier of the network slice, a corresponding access class control parameter, and the like.

In some examples, for a network slice corresponding to an access class, an access class control parameter of the network slice may further include an access class barring factor and an access class barring time of the network slice. For example, the access class barring factor may be a value within a range of [0, 1]. When attempting to access a network slice with the access class, the UE generates a first random number within the range of [0, 1], and if the first random number is less than an access class barring factor of the network slice with the access class that is broadcast by the RAN, the UE can successfully access the network slice with the access class; if the first random number is greater than or equal to an access class barring factor of the network slice with the access class that is broadcast by the RAN, the UE fails to access the network slice. Then the UE may generate a second random number within the range of [0, 1] and start a timer. A timing period of the timer may be a mathematical operation result obtained based on the second random number and the access class barring time. The UE may again attempt to access the network slice with the access class after the timer expires. When the UE simultaneously initiates access to a plurality of network slices, the UE separately attempts to access each network slice based on an access class barring factor and an access class barring time of each network slice.

In some other embodiments, for a network slice corresponding to an access class, an access class control parameter of the network slice may further include an access permission bit identifier. The access permission bit identifier is used to indicate whether the network allows the UE to access the network slice with the access class. For example, the access permission bit identifier may be 0 or 1, 1 indicates that the network does not allow the UE to access the network slice with the access class, and 0 indicates that the UE allows the UE to access the network slice with the access class. For example, in system information broadcast by the RAN, an access permission bit identifier of a first network slice with a first access class is 1, and an access permission bit identifier of a second network slice with a second access class is 0. If the UE initiates access to the first network slice, the network does not allow the UE to access the first network slice; if the UE initiates access to the second network slice, the network allows the UE to access the second network slice. When the UE simultaneously initiates access to a plurality of network slices, the UE separately attempts to access each network slice based on an access permission bit identifier of each network slice.

In some other examples, for a network slice corresponding to an access class, an access class control parameter of the network slice may further include an application type category, and an access class barring factor and an access class barring time that are corresponding to the application type category. When an application layer service of a network slice to which the UE initiates access belongs to an application type category broadcast by the RAN, the network performs access control based on an access class barring factor and an access class barring time that are corresponding to the application type category. For example, for access control of the application layer service of the network slice, the UE may use a method similar to the foregoing implementation including the access process of generating the first random number and comparing the first random number with the access class barring factor and the waiting process of determining a re-access time through a mathematical operation of the access class barring time and the second random number generated by the UE after the access fails. The first random number, the second random number, the access class barring factor, and the access class barring time are corresponding to one application type category in a network slice to which the UE initiates access. When the UE simultaneously initiates access to one or more application layer services of a plurality of network slices, the UE separately attempts to access the one or more application layer services of the plurality of network slices based on an access class of each application type category of each network slice and a corresponding barring factor and access class barring time.

In some other examples, the network may further determine a correspondence between a network slice and an access class control parameter in a network configuration manner. In this case, an access class control parameter broadcast by the RAN through a system information may not include network slice identifier. For example, the network configures that a first access class control parameter corresponds to a first network slice and a second network slice, and the RAN broadcasts the first access class control parameter through a system information. The UE determines, based on the network configuration information, that by default the first access class control parameter corresponds to the first network slice and the second network slice.

In this embodiment, different access class control parameters are configured for different network slices and/or different application type categories, so that differential access control for different network slices and/or different application layer services is implemented.

Embodiment 2

This embodiment provides another method for performing, by a wireless network, independent access control for different network slices. In this embodiment of the present invention, the wireless network allocates an independent random access channel resource to each network slice in the network based on network resource usage and network process policies of different network slices, and an RAN broadcasts the random access channel resource of one or more network slices to UE through a system information. The random access channel resource of the network slice may include an identifier of the network slice, a random access preamble sequence set, a random access time-frequency resource, and the like. The wireless network allocates orthogonal random access channel resources to different network slices, so as to avoid a conflict between random access channels that is caused, for example, when a network slice supports a large quantity of MTC connections but another network slice supports a URLLC service.

In some examples, if the network is not overloaded, that is, a total quantity of available resources of the network is greater than a total quantity of resources currently used by all network slices, the RAN may not distinguish different network slices, and may allocate uniform random access channel resources to all the network slices and broadcast the uniform random access channel resource through a system information. The UE uses the uniform random access channel resource when attempting to access any network slice. For example, the RAN allocates a uniform first random access preamble sequence set and a first random access time-frequency resource to all the network slices. When the UE initiates access to one network slice, the UE selects one random access preamble from the uniform first random access preamble sequence set, and initiates random access on the first random access time-frequency resource. When the UE simultaneously initiates access to a plurality of network slices, the UE selects one random access preamble from the uniform first random access preamble sequence set for each network slice, and initiates random access on the first random access time-frequency resource. Correspondingly, the RAN separately processes the random access to the plurality of network slices that is simultaneously initiated by the UE. For example, the UE simultaneously initiates random access to a first network slice and a second network slice, and the RAN may accept the random access to the first network slice that is initiated by the UE, and reject the random access to the second network slice that is initiated by the UE.

In some other examples, the RAN may allocate an independent random access channel resource to each network slice, and broadcast a random access channel resource of one or more network slices through a system information. For any network slice, when attempting to access the network slice, the UE uses a random access channel resource allocated by the RAN to the network slice. For example, the RAN allocates a first random access preamble sequence set and a first random access time-frequency resource to a first network slice, and allocates a second random access preamble sequence set and a second random access time-frequency resource to a second network slice. When the UE initiates access to the first network slice, the UE selects a random access preamble from an independent first random access preamble sequence set, and initiates random access on the first random access time-frequency resource. When the UE simultaneously initiates access to the first network slice and the second network slice, the UE selects a random access preamble from the independent first random access preamble sequence set, and initiates random access to the first network slice on the first random access time-frequency resource; and selects a random access preamble from the independent second random access preamble sequence set, and initiates random access to the second network slice on the second random access time-frequency resource. Correspondingly, the RAN separately processes the random access to the plurality of network slices that is simultaneously initiated by the UE.

In some other examples, the RAN may use a combination of the foregoing examples. To be specific, the RAN allocates independent random access channel resources to some network slices, allocates uniform random access channel resources to some other network slices, and broadcasts a random access channel resource of one or more network slices through a system information. For any network slice, when attempting to access the network slice, the UE uses a random access channel resource allocated by the RAN to the network slice. For example, the RAN allocates an independent first random access preamble sequence set and first random access time-frequency resource to a first network slice, and allocates a uniform second random access preamble sequence set and a second random access time-frequency resource to a second network slice and a third network slice. When the UE initiates access to the second network slice and/or the third network slice, the UE selects one or two random access preambles from the uniform second random access preamble sequence set, and initiates random access to the second network slice or the third network slice or both on the second random access time-frequency resource. Correspondingly, the RAN separately processes the random access to the plurality of network slices that is simultaneously initiated by the UE.

In this embodiment, orthogonal random access channel resources are allocated to different network slices, so that differential access control for different network slices is implemented.

Embodiment 3

This embodiment provides another method for performing, by a wireless network, independent access control for different network slices. In this embodiment of the present invention, a wireless network performs, based on network resource usage and network process policies of different network slices, independent processing on a radio resource control (RRC) connection request initiated by UE for each network slice. When overload occurs, the wireless network may reject the UE associated with an overloaded slice and indicate an RRC wait time. In this way, overload can be alleviated by allowing the UE to initiate a connection request again after a specific period of time. Specifically, when resource overload occurs in one or more network slices, the wireless network performs independent RRC connection rejection processing on an RRC connection request initiated by the UE for the one or more network slices. Further, the wireless network may further perform independent RRC connection rejection processing on RRC connection requests with different causes that are initiated by the UE for the one or more network slices. The RRC connection causes may include "mobile originating calls", "mobile originating signaling", "mobile originating emergency calls", "mobile terminating session", and the like.

In some examples, an RRC connection request initiated by the UE for one or more network slices includes one or more network slice identifiers. When an RAN determines, based on network resource usage in the network, that the one or more network slices are overloaded, the RAN sends an RRC connection rejection message to the UE, to reject the RRC connection request initiated by the UE for the one or more network slices. The RRC connection rejection message may include the slice identifier of the one or more network slices for which the UE initiates the RRC connection request. The slice identifier is used to indicate the rejected RRC connection request initiated by the UE for the one or more network slices.

The RRC connection rejection message sent by the RAN may include an RRC wait time corresponding to the rejected RRC connection request initiated by the UE for the one or more network slices. The RRC wait time may be a uniform wait time that is set for all the network slices. The UE may initiate an RRC connection request again for any network slice after the RRC wait time expires. The RRC wait time may also be an independent wait time that is set for each network slice. The UE can initiate an RRC connection request again for a specific network slice only when the RRC wait time of the network slice expires.

In some other examples, the RAN may further reject RRC connection requests with some causes based on a cause of an RRC connection request initiated by the UE for the one or more network slices. For example, if the RAN rejects an RRC connection request with a specific cause such as "mobile originating calls", "mobile originating voice call", or "delay-tolerable access", that is initiated by the UE for one or more network slices, the RAN may send an RRC connection rejection message to the UE after receiving an RRC connection request with the foregoing RRC connection cause that is initiated by the UE for one or more network slices. The rejection message includes the specific cause of the rejected connection, so as to reject an RRC connection request with the specific cause for one or more network slices.

Further, the RRC connection rejection message sent by the RAN may include an RRC wait time corresponding to the rejected RRC connection request with the specific cause that is initiated for the one or more network slices. The RRC wait time may be a uniform wait time that is set for all RRC connection requests that are rejected for specific causes. The UE may again initiate, after the RRC wait time expires, an RRC connection request for a network slice that is rejected for the specific cause. The RRC wait time may also be an independent wait time that is set for each RRC connection request that is rejected for a specific cause. Only when an RRC wait time corresponding to an RRC connection request rejected for a specific cause expires, the UE can again initiate the RRC connection request for a network slice that is rejected for the specific cause.

In this embodiment, an RRC connection request with a specific cause that is initiated for one network slice or different network slices is rejected based on network resource usage, and a uniform or independent RRC wait time is provided, so that differential access control of different network slice RRC connections is implemented.

Embodiment 4

This embodiment provides another method for performing, by a wireless network, independent access control for different network slices. In this embodiment of the present invention, a wireless network performs, based on network resource usage and network process policies of different network slices, independent processing on a radio resource control (RRC) connection to each network slice that has been established by UE. When overload occurs, the wireless network may release the UE associated with an overloaded slice and indicate an RRC wait time. In this way, overload can be alleviated by allowing the UE to initiate a connection request again after a specific period of time. Specifically, when resource overload occurs in one or more network slices, the wireless network performs independent RRC connection release processing on an RRC connection to the one or more network slices that has been established by the UE. Further, the wireless network may further perform independent RRC connection release processing on RRC connections to the one or more network slices that have been established by the UE for different causes. The RRC connection causes may include "mobile originating calls", "mobile originating signalling", "mobile originating emergency calls", and the like.

In some examples, when the UE has established an RRC connection to one or more network slices, if an RAN determines, based on network resource usage in the network, that the one or more network slices are overloaded, the RAN sends an RRC connection release message to the UE to release the RRC connection to the one or more network slices that has been established by the UE. The RRC connection release message may include a slice identifier of the one or more network slices to which the UE has established the RRC connection. The slice identifier is used to indicate the RRC connection to the one or more network slices that has been established by the UE and that is to be released.

Further, the RRC connection release message sent by the RAN may include an RRC wait time corresponding to the RRC connection to the one or more network slices that has been established by the UE and that is to be released. The RRC wait time may be a uniform wait time that is set for all the network slices. The UE may initiate an RRC connection request again for any network slice after the RRC wait time expires. The RRC wait time may also be an independent wait time that is set for each network slice. The UE can initiate an RRC connection request again for a specific network slice only when the RRC wait time of the network slice expires.

In some other examples, the RAN may further release an RRC connection with a specific cause based on a cause of an RRC connection to the one or more network slices that has been established by the UE. For example, if the RAN determines to release an RRC connection to one or more network slices that has been established by the UE for a specific cause such as "mobile originating calls", "mobile originating voice calls", or "delay-tolerable access", the RAN may send an RRC connection release message to the UE. The release message includes the specific cause of the to-be-released connection, so as to release the established RRC connection, to the one or more network slices, with the specific cause.

Further, the RRC connection release message sent by the RAN may include an RRC wait time corresponding to the to-be-released RRC connection, to the one or more network slices, with the specific cause. The RRC wait time may be a uniform wait time that is set for all RRC connections to be released for specific causes. The UE may again initiate, after the RRC wait time expires, a request for an RRC connection to a network slice that is released for the specific cause. The RRC wait time may also be an independent wait time that is set for each RRC connection that is released for a specific cause. Only when the RRC wait time expires, the UE can again initiate a request for an RRC connection to a network slice that is released for the specific cause.

In this embodiment, an established RRC connection, to one network slice or different network slices, with a specific cause is released based on network resource usage, and a uniform or independent RRC wait time is provided, so that differential management of different network slice RRC connections is implemented.

Embodiment 5

Figure 3:
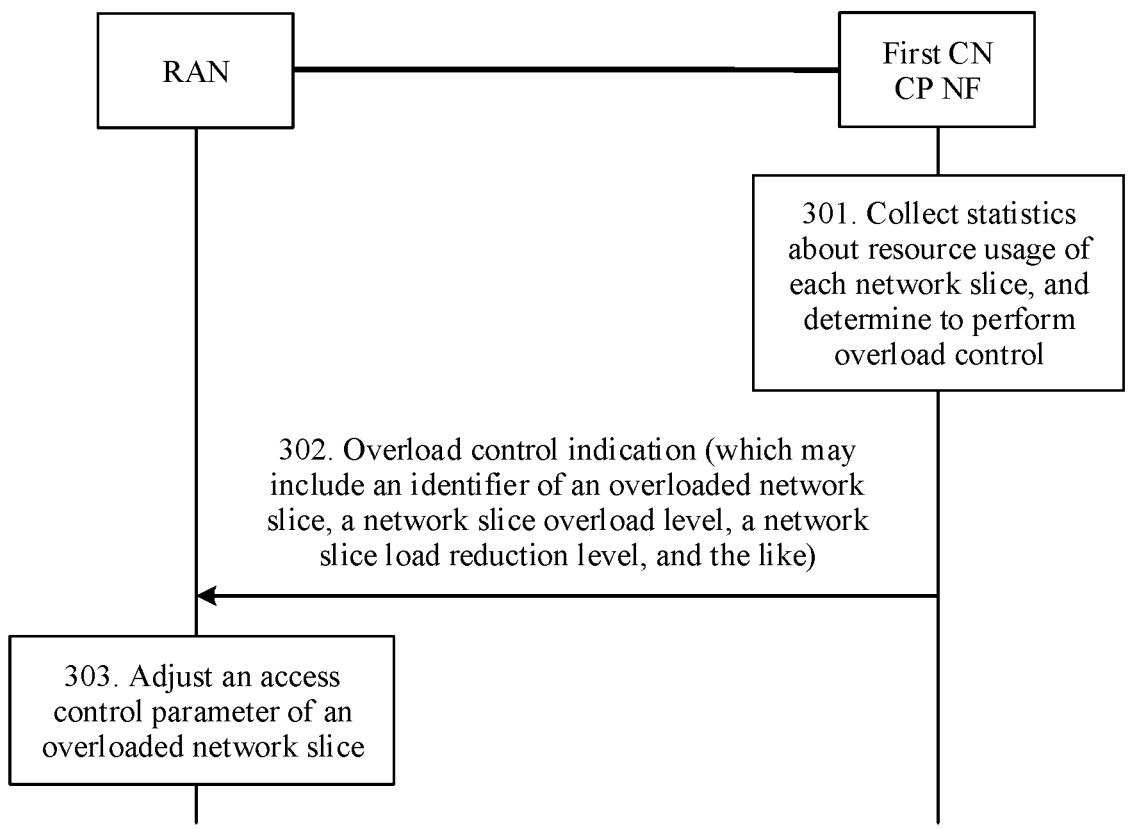
FIG. 3 is a schematic flowchart of a wireless network access control method according to an embodiment of the present invention.

This embodiment provides a method for implementing, by a wireless network, access control of different network slices based on a network resource status. The method is used to implement access control of different network slices when one or more network slices in a CN are overloaded. FIG. 3 is a schematic flowchart of an embodiment of the wireless network access control method according to the present invention. In this embodiment, one or more network slices in the CN are overloaded, a first CP NF in the CN performs triggering to instruct an RAN to perform overload control, and the RAN performs access control on the UE. The first CP NF may function as a session manager. In the architecture of shared CP NFs in FIG. 1, in some example, the first CN CP NF may be a CP NF among CP NFs shared by a plurality of network slices in the CN, and in these examples, the first CN CP NF may directly send an overload control indication to the RAN; and in some other examples, the first CN CP NF may be a CP NF among dedicated CP NFs of each network slice in the CN, and in these examples, the first CN CP NF sends an overload control indication to a shared CP NF, and the shared CP NF forwards the overload control indication to the RAN. In the architecture of dedicated CP NFs in FIG. 2, the first CN CP NF is a dedicated CP NF of each network slice in the CN. A procedure of this embodiment is shown in FIG. 3, and includes the following steps.

301. The first CN CP NF collects statistics about resource usage of each network slice, and determines to perform overload control.

In this embodiment of the present invention, in an aspect, if the first CN CP NF is a shared CP NF, the first CN CP NF collects statistics about resource usage of each network slice in the CN, and when detecting that one or more network slices are overloaded, that is, when resources required by each of the one or more network slices exceed resources allocated by the CN to the network slice, the first CN CP NF determines to perform overload control on the one or more network slices. In another aspect, if the first CN CP NF is a dedicated CP NF, the first CN CP NF collects statistics about resource usage of a network slice to which the CN CP NF belongs, and when detecting that the network slice is overloaded, the first CN CP NF determines to perform overload control on the network slice to which the CN CP NF belongs. It should be noted that when the first CN CP NF is a dedicated CP NF, if a plurality of network slices in the CN are overloaded, a first CN CP NF corresponding to each network slice may independently determine to perform overload control on the network slice to which the first CN CP NF belongs.

302. The first CN CP NF sends an overload control indication to the RAN.

The overload control indication may include an identifier of an overloaded network slice.

In this embodiment of the present invention, in an aspect, if the first CN CP NF is a shared CP NF, the first CN CP NF may send an identifier of one or more overloaded network slices to the RAN. In another aspect, if the first CN CP NF is a dedicated CP NF, the first CN CP NF may send, to the RAN, an identifier of an overloaded network slice to which the CN CP NF belongs.

Further, the overload control indication may include an overload level of an overloaded network slice.

In this embodiment of the present invention, the first CN CP NF may send an overload level of one or more overloaded network slices. The overload level may indicate an overload level of a network slice, such as extremely severe, severe, or average; or may indicate a percentage of resources required by a network slice to resources allocated by the CN to the network slice, such as 150%, 120%, or 100%.

Further, the overload control indication may include a load reduction level of the overloaded network slice.

In this embodiment of the present invention, the first CN CP NF may further send a load reduction level of one or more congested network slices. The load reduction level may indicate a percentage such as 10%, 30%, or 50% by which the RAN needs to reduce access to the one or more congested network slices.

303. The RAN adjusts an access control parameter of an overloaded network slice.

In this embodiment of the present invention, the RAN receives the overload control indication sent by the CN, adjusts the corresponding access control parameter of the one or more overloaded network slices indicated in the overload control indication, and sends an adjusted access control parameter to the UE through a broadcast or unicast indication, so that the UE applies the adjusted access control parameter when initiating network access to the overloaded network slice.

Specifically, the RAN may adjust the access control parameter of the overloaded network slice by using the following adjustment method:

In the access control manner in the foregoing Embodiment 1, the RAN may dynamically adjust an access class control parameter of each network slice based on resource usage of different network slices in the network. In some implementations, the access class control parameter includes an access class barring factor and an access class barring time of the network slice. In this case, when one or more network slices in the network are overloaded, the RAN may decrease the access class barring factor of the one or more network slices and/or increase the access class barring time of the one or more network slices. In some other embodiments, the access class control parameter may include an access permission bit identifier. In this case, when a network slice whose access permission bit identifier is "allowed" in the network is overloaded, the RAN may set the access permission bit identifier of the overloaded network slice to "prohibited". In some other embodiments, the access class control parameter includes an application type category, and an access class barring factor and an access class barring time that are corresponding to the application type category. In this case, when resources of an application layer service that is of a network slice to which the UE initiates access and that belongs to an application type category broadcast by the RAN are overloaded, the RAN may decrease an access class barring factor corresponding to the application type category of the network slice and/or increase an access class barring time of the one or more network slices.

In the access control manner in the foregoing Embodiment 2, the RAN may dynamically adjust a random access channel resource of each network slice based on resource usage of different network slices in the network. When one or more network slices in the network are overloaded, the RAN may reduce a random access channel resource allocated to the one or more overloaded network slices or even allocate no random access channel resource to the overloaded network slice, so as to prevent affecting access to another network slice. For example, the RAN allocates a first random access preamble sequence set and a first random access time-frequency resource to a first network slice. In some implementations, when the first network slice is overloaded, the RAN may allocate a second random access preamble sequence set and/or a second random access time-frequency resource to the first network slice, and broadcast the updated random access channel resource of the first network slice through a system information. A quantity of preamble sequences in the second random access preamble sequence set is less than that of the first random access preamble sequence set, and a quantity of time-frequency resources in the second random access time-frequency resource is less than that of the first random access time-frequency resource. In this case, the UE uses the updated random access channel resource of the first network slice to initiate random access to the first network slice. In some other implementations, when the first network slice is overloaded, the RAN may allocate no random access channel resource to the first network slice, and carry no random access channel resource allocation information of the first network slice in system information. In this case, when initiating access to the first network slice, the UE cannot access to the network because the UE cannot obtain a corresponding random access channel resource.

In the access control manner in the foregoing Embodiment 3, when the UE initiates an RRC connection request for one or more network slices and the one or more network slices are overloaded, the RAN may reject the RRC connection request for the one or more network slices. Further, the RAN may dynamically adjust an RRC wait time of each network slice based on overload levels of different network slices. When an overload level of a network slice is higher, the RAN may set a longer RRC wait time for the network slice; on the contrary, when an overload level of a network slice is lower, the RAN may set a shorter RRC wait time for the network slice. For example, both a first network slice and a second network slice are overloaded, and an overload level of the first network slice is higher than an overload level of the second network slice. Both RRC connection requests initiated by the UE for the first network slice and the second network slice are rejected by the RAN. In this case, an RRC connection rejection message for the first network slice that is sent by the RAN includes a first RRC wait time, an RRC connection rejection message for the second network slice that is sent by the RAN includes a second RRC wait time, and the first RRC wait time is longer than the second RRC wait time. Further, the RAN may dynamically adjust RRC wait times corresponding to RRC connection rejections with different causes for one network slice. When an overload level of an RRC connection corresponding to a specific cause is higher, the RAN may set a longer RRC wait time for the RRC connection rejection with the specific cause. For example, both RRC connections of "mobile originating calls" and "mobile originating signaling" to the first network slice are overloaded, and an overload level of the RRC connection of "mobile originating calls" is higher than an overload level of the RRC connection of "mobile originating signaling". Both RRC connection requests with the causes of "mobile originating calls" and "mobile originating signaling" that are initiated by the UE for the first network slice are rejected by the RAN. In this case, an RRC connection rejection message returned by the RAN in response to the RRC connection request with the cause of "mobile originating calls" that is initiated for the first network slice includes the cause of "mobile originating calls" and a first RRC wait time; an RRC connection rejection message returned by the RAN in response to the RRC connection request with the cause of "mobile originating signaling" that is initiated for the first network slice includes the cause of "mobile originating signaling" and a second RRC wait time; and the first RRC wait time is longer than the second RRC wait time.

In the access control manner in the foregoing Embodiment 4, when an RRC connection to one or more network slices that has been established by the UE is overloaded, the RAN may release the RRC connection to the one or more network slices. Further, the RAN may dynamically adjust an RRC wait time of each network slice based on overload levels of different network slices. When an overload level of a network slice is higher, the RAN may set a longer RRC wait time for the network slice; on the contrary, when an overload level of a network slice is lower, the RAN may set a shorter RRC wait time for the network slice. For example, both a first network slice and a second network slice are overloaded, and an overload level of the first network slice is higher than an overload level of the second network slice. The RAN releases RRC connections to the first network slice and the second network slice that have been established by the UE. In this case, an RRC connection release message for the first network slice that is sent by the RAN includes a first RRC wait time, an RRC connection release message for the second network slice that is sent by the RAN includes a second RRC wait time, and the first RRC wait time is longer than the second RRC wait time. Further, the RAN may dynamically adjust RRC wait times corresponding to RRC connection release with different causes for one network slice. When an overload level of an RRC connection corresponding to a specific cause is higher, the RAN may set a longer RRC wait time for the RRC connection release with the specific cause. For example, both RRC connections of "mobile originating calls" and "mobile originating signaling" to the first network slice are overloaded, and an overload level of the RRC connection of "mobile originating calls" is higher than an overload level of the RRC connection of "mobile originating signaling". Both RRC connections to the first network slice that are established by the UE and that are initiated for the causes of "mobile originating calls" and "mobile originating signaling" are released by the RAN. In this case, an RRC connection release message sent by the RAN for the RRC connection to the first network slice that is initiated for the cause of "mobile originating calls" includes the cause of "mobile originating calls" and a first RRC wait time; an RRC connection release message sent by the RAN for the RRC connection to the first network slice that is initiated for the cause of "mobile originating signaling" includes the cause of "mobile originating signaling" and a second RRC wait time; and the first RRC wait time is longer than the second RRC wait time.

In some implementations, the overload control indication sent by the first CN CP NF in the foregoing step 302 may further include processing of RRC connection requests with different causes for one or more network slices. For example, the overload control indication sent by the first CN CP NF may include instructing to reject an RRC connection request, initiated by the UE for one or more network slices, with a specific cause such as "mobile originating calls", "a voice call initiated by the UE", or "delay-tolerable access". The overload control indication sent by the first CN CP NF may further include an RRC wait time corresponding to the rejected RRC connection request with the specific cause that is initiated for the one or more network slices. In this case, after receiving the overload control indication message from the first CN CP NF, the RAN adjusts the access control parameter of the overloaded network slice based on the overload control indication message.

In some other implementations, the overload control indication sent by the first CN CP NF in the foregoing step 302 may further include processing of RRC connections to one or more network slices that have been established for different causes. For example, the overload control indication sent by the first CN CP NF may instruct to release an RRC connection to one or more network slices that has been established by the UE for a specific cause such as "mobile originating calls", "a voice call initiated by the UE", or "delay-tolerable access". The overload control indication sent by the first CN CP NF may further include an RRC wait time corresponding to the released RRC connection, to the one or more network slices, with the specific cause. In this case, after receiving the overload control indication message from the first CN CP NF, the RAN adjusts the access control parameter of the overloaded network slice based on the overload control indication message.

In the foregoing access control manners in the different embodiments, decreasing an access class barring factor, and/or increasing an access class barring time, and/or decreasing a random access channel resource, and/or increasing an RRC wait time, and/or the like may be implemented by the RAN by increasing or decreasing a quantity of fixed or changing step size that is preset by the network, or may be implemented by the RAN by increasing or decreasing a quantity through calculation by using an intelligent algorithm.

Embodiment 6

Figure 4:
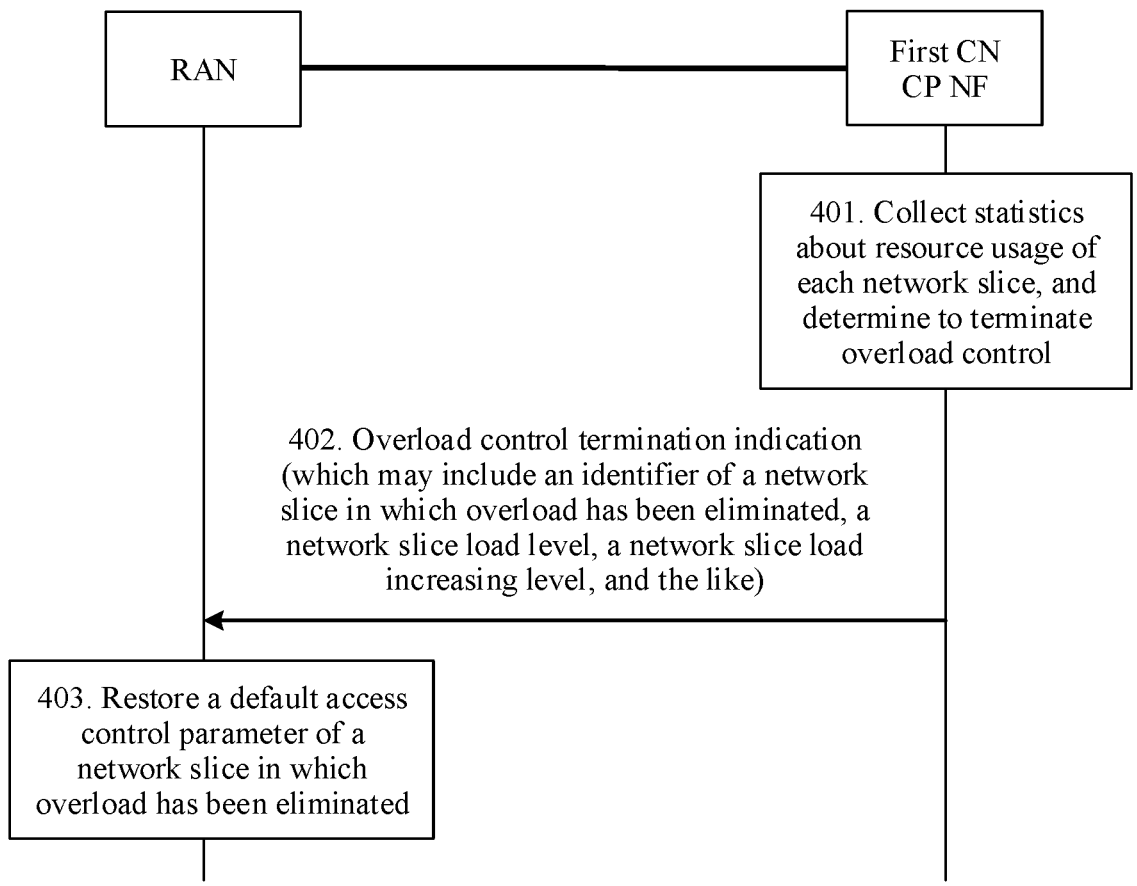
FIG. 4 is a schematic flowchart of a wireless network access control method according to an embodiment of the present invention.

This embodiment provides another method for implementing, by a wireless network, access control of different network slices based on a network resource status. The method is used to implement access control of different network slices after overload in one or more network slices in a CN has been eliminated. FIG. 4 is a schematic flowchart of another embodiment of the wireless network access control method according to the present invention. In this embodiment, after overload control is performed on one or more overloaded network slices in a CN, the one or more network slices are not overloaded. A first CN CP NF determines to terminate overload control from statistics collection, and instructs an RAN to perform corresponding access control. As shown in FIG. 4, the method includes the following steps.

401. The first CN CP NF collects statistics about resource usage of each network slice, and determines to terminate overload control.

In this embodiment of the present invention, in an aspect, if the first CN CP NF is a shared CP NF, the first CN CP NF collects statistics about resource usage of a plurality of network slices in the CN, and when detecting that overload in one or more previously overloaded network slices has been eliminated, that is, when resources allocated by the CN to the one or more network slices can meet a resource requirement of the one or more network slices, the first CN CP NF determines to terminate overload control on the one or more network slices. In another aspect, if the first CN CP NF is a dedicated CP NF, the first CN CP NF collects statistics about resource usage of a network slice corresponding to the CN CP NF, and when detecting that overload in the network slice has been eliminated, the first CN CP NF determines to terminate overload control on the network slice corresponding to the CN CP NF. It should be noted that when the first CN CP NF is a dedicated CP NF, and overload in a plurality of network slices in the CN has been eliminated, a first CN CP NF corresponding to each network slice may independently determine to terminate overload control on the network slice to which the first CN CP NF belongs.

402. The first CN CP NF sends an overload control termination indication to an RAN.

The overload control termination indication may include an identifier of a network slice in which overload has been eliminated.

In this embodiment of the present invention, in an aspect, if the first CN CP NF is a shared CP NF, the first CN CP NF may send, to the RAN, an identifier of one or more network slices in which overload has been eliminated. In another aspect, if the first CN CP NF is a dedicated CP NF, the first CN CP NF may send, to the RAN, an identifier of a network slice in which overload has been eliminated and to which the CN CP NF belongs.

Further, the overload control termination indication may include a load level of a network slice in which overload has been eliminated.

In this embodiment of the present invention, the first CN CP NF may send a load level of one or more network slices in which overload has been eliminated. The load level may indicate a load level of a network slice, such as extremely light load, averagely light load, or light load; or may indicate a percentage of resources used by a network slice to resources allocated by the CN to the network slice, such as 10%, 50%, or 80%.

Further, the overload control termination indication may include a load increasing level of a network slice in which overload has been eliminated.

In this embodiment of the present invention, the first CN CP NF may further send a load increasing level of one or more network slices in which overload has been eliminated. The load increasing level may indicate a percentage such as 10%, 30%, or 50% by which the RAN needs to increase resources used by the one or more network slices relative to resources allocated by the network.

403. The RAN restores a default access control parameter of a network slice in which overload has been eliminated.

The default access control parameter is a default access control parameter that is set by the network for each network slice based on an operator policy and the like, or may be an access control parameter used by the network before overload control is performed.

In this embodiment of the present invention, the RAN receives the overload control termination indication sent by the CN, restores, based on the one or more network slices in which overload has been eliminated and that are indicated in the overload control termination indication, the default access control parameter of the one or more network slices, and sends the restored access control parameter to the UE in a broadcast or unicast manner, so that the UE applies the default access control parameter when initiating network access to the network slice in which overload has been eliminated.

Embodiment 7

Figure 5:
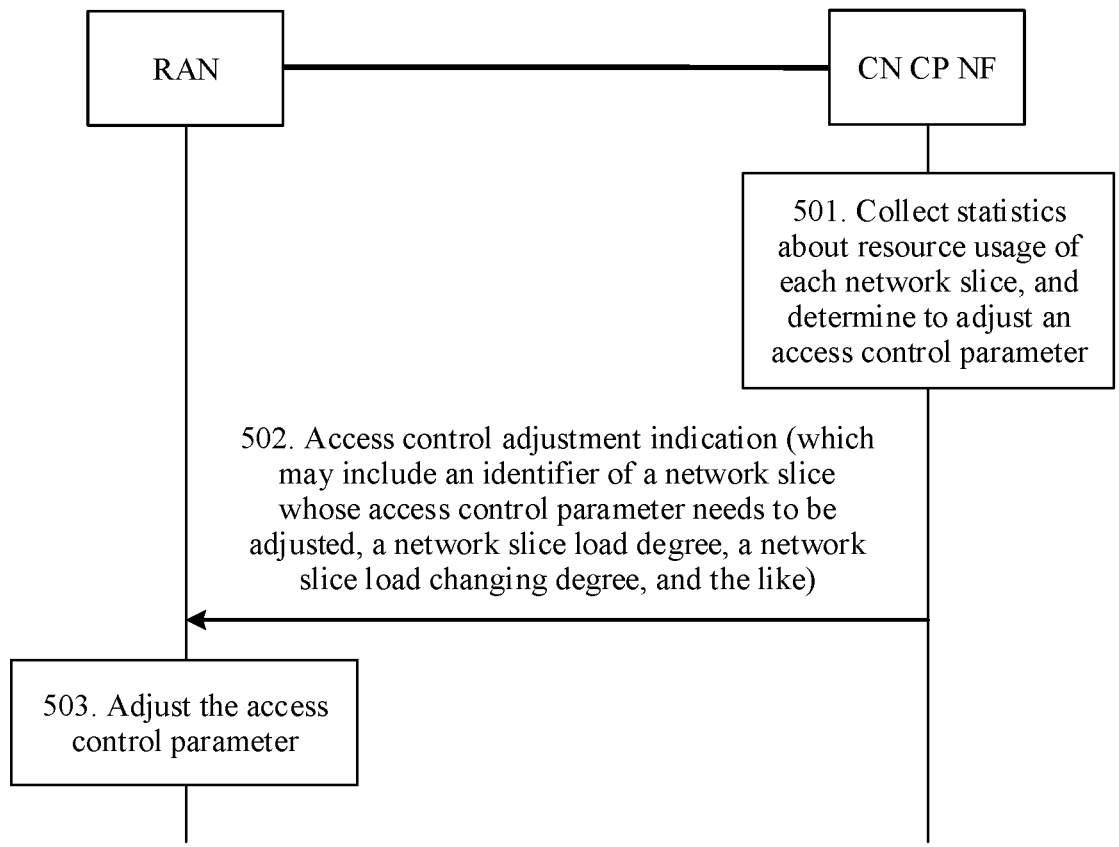
FIG. 5 is a schematic flowchart of a wireless network access control method according to an embodiment of the present invention.

This embodiment provides another method for implementing, by a wireless network, access control of different network slices based on a network resource status. The method is used to implement access control of different network slices after resource usage of one or more network slices in a CN changes. FIG. 5 is a schematic flowchart of an embodiment of the wireless network access control method according to the present invention. In this embodiment, when resource usage of one or more network slices in the CN changes, a first CP NF determines to adjust an access control parameter of the one or more network slices. A procedure of this embodiment includes the following steps.

501. The first CN CP NF collects statistics about resource usage of each network slice, and determines to adjust an access control parameter of the network slice.

In this embodiment of the present invention, in an aspect, if the first CN CP NF is a shared CP NF, the first CN CP NF collects statistics about resource usage of each network slice in the CN, and when detecting that an access control parameter of one or more network slices needs to be adjusted, the first CN CP NF determines to perform an access control adjustment on the one or more network slices. In another aspect, if the first CN CP NF is a dedicated CP NF, the first CN CP NF collects statistics about resource usage of a network slice to which the CN CP NF belongs, and when detecting that an access control parameter of the network slice needs to be adjusted, the first CN CP NF determines to perform an access control adjustment on the network slice to which the CN CP NF belongs. It should be noted that when the first CN CP NF is a dedicated CP NF, if access control parameters of a plurality of network slices in the CN need to be adjusted, a first CN CP NF corresponding to each network slice may independently determine to perform an access control adjustment on the network slice to which the first CN CP NF belongs.

502. The first CN CP NF sends an access control adjustment indication to an RAN.

The access control adjustment indication may include an identifier of a network slice whose access control parameter needs to be adjusted.

In this embodiment of the present invention, in an aspect, if the first CN CP NF is a shared CP NF, the first CN CP NF may send, to the RAN, an identifier of one or more network slices whose access control parameters need to be adjusted. In another aspect, if the first CN CP NF is a dedicated CP NF, the first CN CP NF may send, to the RAN, an identifier of a network slice whose access control parameter needs to be adjusted and to which the CN CP NF belongs.

The access control adjustment indication may further include a load level of a network slice whose access control parameter needs to be adjusted.

In this embodiment of the present invention, the first CN CP NF may send a load level of one or more network slices whose access control parameters need to be adjusted. The load level may indicate a load level of a network slice, such as light load, full load, or overload; or may indicate a percentage of resources required by a network slice to resources allocated by the CN to the network slice, such as 50%, 100%, or 150%.

The access control adjustment indication may further include a load changing level of a network slice whose access control parameter needs to be adjusted.

In this embodiment of the present invention, the first CN CP NF may further send a load changing level of one or more network slices whose access control parameters need to be adjusted. The load changing level may indicate a change that the RAN needs to make to load in the one or more network slices whose access control parameters need to be adjusted, for example, a 10% increasing or a 30% reduction.

503. The RAN adjusts the access control parameter of the network slice.

In this embodiment of the present invention, the RAN receives the access control adjustment indication sent by the CN, adjusts the corresponding access control parameter of the one or more network slices whose access control parameters need to be adjusted, and sends an adjusted access control parameter to the UE through a broadcast or unicast message, so that the UE applies the adjusted access control parameter when initiating network access to the network slice.

Specifically, the RAN may adjust the access control parameter of the overloaded network slice by using the following adjustment method:

In the access control manner in the foregoing Embodiment 1, the RAN may dynamically adjust an access class control parameter of each network slice based on resource usage of different network slices in the network. In some implementations, the access class control parameter includes an access class barring factor and an access class barring time of the network slice. In this case, when an access control parameter of one or more network slices in the network needs to be adjusted, based on a network slice load changing level in the access control adjustment indication, the RAN may decrease or increase the access class barring factor of the one or more network slices, and/or decrease or increase the access class barring time of the one or more network slices. In some other embodiments, the access class control parameter may include an access permission bit identifier. In this case, based on a network slice load changing level in the access control adjustment indication, the RAN may set an access permission identifier of a network slice whose load needs to be increased and whose access identifier is "prohibited" to "allowed", and set an access permission identifier of a network slice whose load needs to be reduced and whose access identifier is "allowed" to "prohibited". In some other embodiments, the access class control parameter includes an application type category, and an access class barring factor and an access class barring time that are corresponding to the application type category. In this case, when an access control parameter of an application layer service of a network slice that is initiated by the UE and that belongs to an application type category broadcast by the RAN needs to be adjusted, based on a network slice load changing level in the access control adjustment indication, the RAN may decrease or increase an access class barring factor corresponding to the application type category of the network slice, and/or decrease or increase an access class barring time of the one or more network slices.

In the access control manner in the foregoing Embodiment 2, the RAN may dynamically adjust a random access channel resource of each network slice based on resource usage of different network slices in the network. When an access control parameter of one or more network slices in the network needs to be adjusted, the RAN may increase or reduce, based on a network slice load changing level in the access control adjustment indication, a random access channel resource allocated to the one or more network slices.

In the access control manners in the foregoing Embodiments 3 and 4, the RAN may dynamically adjust an RRC wait time of each network slice based on load levels of different network slices in the network. When an access control parameter of one or more network slices in the network needs to be adjusted, the RAN may increase or decrease, based on a network slice load changing level in the access control adjustment indication, an RRC wait time of the one or more network slices. Further, the RAN rejects or releases RRC connections, to one or more network slices, with different causes, and may also increase or decrease, based on a network slice load changing level in the access control adjustment indication, RRC wait times corresponding to the RRC connection rejection or release with the different causes.

In the foregoing access control manners in the different embodiments, decreasing or increasing an access class barring factor, and/or decreasing or increasing an access class barring time, and/or decreasing or increasing a random access channel resource, and/or decreasing or increasing an RRC wait time, and/or the like may be implemented by the RAN by increasing or decreasing a quantity of fixed or changing step size preset by the network, or may be implemented by the RAN by increasing or decreasing a quantity through calculation by using an intelligent algorithm.

Embodiment 8

Figure 6:
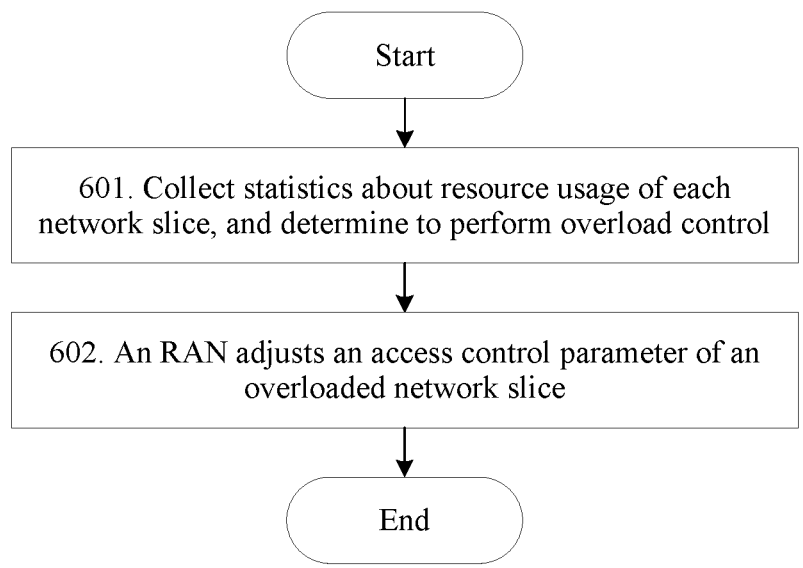
FIG. 6 is a schematic flowchart of a wireless network access control method according to an embodiment of the present invention.

This embodiment provides another method for implementing, by a wireless network, access control of different network slices based on a network resource status. The method is used to implement access control of different network slices when one or more network slices in an RAN are overloaded. FIG. 6 is a schematic flowchart of another embodiment of the wireless network access control method according to the present invention. In this embodiment, when the RAN detects that one or more network slices are overloaded, the RAN determines to perform overload control and perform corresponding access control for the UE. A procedure of this embodiment includes the following steps.

601. The RAN collects statistics about resource usage of each network slice, and determines to perform overload control.

In this embodiment of the present invention, the RAN collects statistics about resource usage of each network slice in the RAN, and when detecting that one or more network slices are overloaded, that is, when resources required by each of the one or more network slices exceed resources allocated by the RAN to the network slice, the RAN determines to perform overload control on the one or more network slices.

602. The RAN adjusts an access control parameter of an overloaded network slice.

An implementation of the foregoing step 602 is similar to that of step 303 in the foregoing embodiment, and details are not described herein. The RAN may adjust the access control parameter of the overloaded network slice by using the method in Embodiment 5. Details are not described herein.

Embodiment 9

Figure 7:
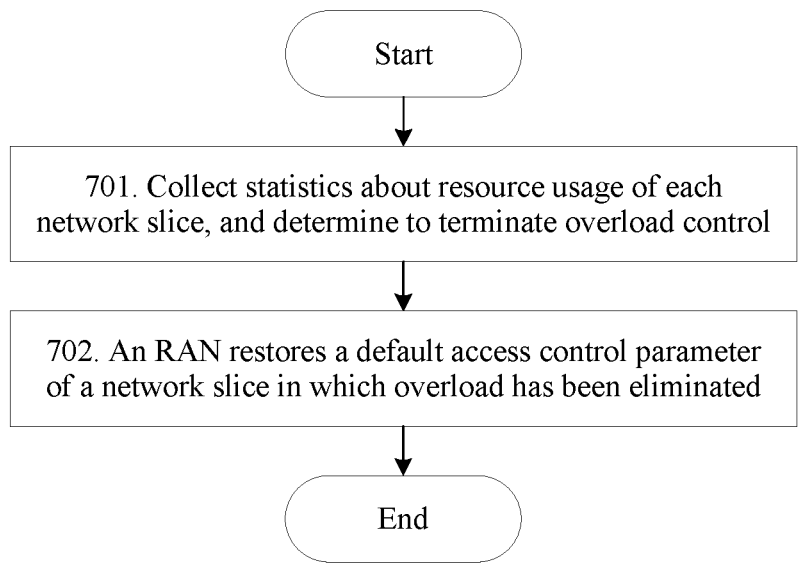
FIG. 7 is a schematic flowchart of a wireless network access control method according to an embodiment of the present invention.

This embodiment provides another method for implementing, by a wireless network, access control of different network slices based on a network resource status. The method is used to implement access control of different network slices after overload in one or more network slices in an RAN is eliminated. FIG. 7 is a schematic flowchart of another embodiment of the wireless network access control method according to the present invention. In this embodiment, when the RAN detects that one or more overloaded network slices are not overloaded after overload control, the RAN determines to terminate overload control and perform corresponding access control for the UE. A procedure of this embodiment includes the following steps.

701. The RAN collects statistics about resource usage of each network slice, and determines to terminate overload control.

In this embodiment of the present invention, the RAN collects statistics about resource usage of each network slice in the RAN, and after detecting that overload in one or more overloaded network slices has been eliminated, the RAN determines to terminate overload control of the one or more network slices.

702. The RAN restores a default access control parameter of a network slice in which overload has been eliminated.

An implementation of the foregoing step 702 is similar to that of step 403 in the foregoing embodiment, and details are not described herein.

Embodiment 10

Figure 8:
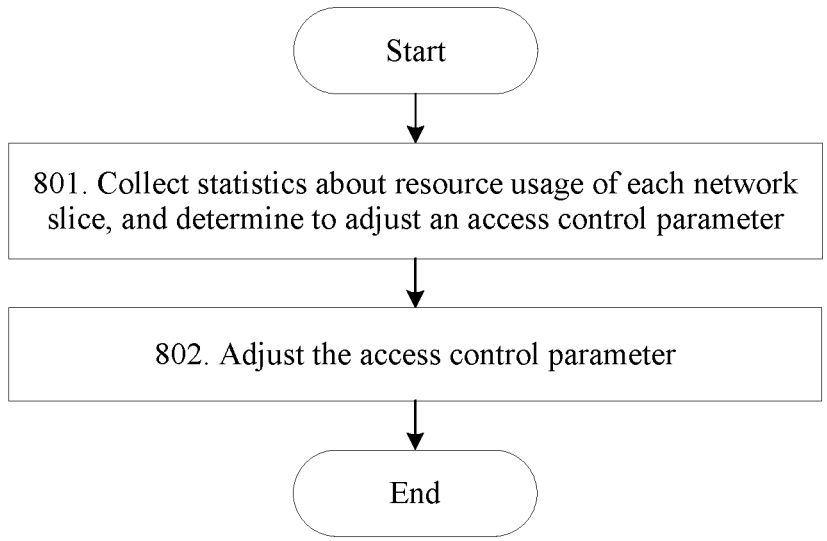
FIG. 8 is a schematic flowchart of a wireless network access control method according to an embodiment of the present invention.

This embodiment provides another method for implementing, by a wireless network, access control of different network slices based on a network resource status. The method is used to implement, by an RAN, access control of different network slices based on resource usage of one or more network slices. FIG. 8 is a schematic flowchart of another embodiment of the wireless network access control method according to the present invention. In this embodiment, when the RAN detects that an access control parameter of one or more network slices needs to be adjusted, the RAN determines to adjust the access control parameter. A procedure of this embodiment includes the following steps.

801. The RAN collects statistics about resource usage of each network slice, and determines to adjust an access control parameter.

In this embodiment of the present invention, the RAN collects statistics about RAN resource usage of each network slice in the RAN, and after detecting that an access control parameter of one or more network slices needs to be adjusted, the RAN determines to adjust an access control parameter of the one or more network slices.

802. The RAN adjusts the access control parameter of the network slice.

An implementation of the foregoing step 802 is similar to that of step 503 in the foregoing embodiment, and details are not described herein.

The RAN may adjust the access control parameter of the overloaded network slice by using the method in Embodiment 7. Details are not described herein.

It should be noted that the foregoing Embodiment 1 to Embodiment 10 describe implementations of access control in a public land mobile network (PLMN). When the radio access network is shared by a plurality of PLMNs, each PLMN has an independent set of access control parameters. The RAN needs to broadcast access control parameters of each PLMN to support network sharing. Optionally, the RAN carries an identifier of the PLMN and the access control parameters corresponding to the PLMN in system information.

The foregoing mainly describes the solutions provided in the embodiments of the present invention from the perspective of interaction between network elements and processing by the network elements. It can be understood that, to implement the foregoing functions, each network element includes a corresponding hardware structure and/or software module for executing the functions. A person skilled in the art may be easily aware that this patent application can be implemented in a form of hardware or a combination of hardware and computer software with reference to the disclosed embodiments of this specification. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this patent application.

In this patent application, apparatus embodiments for implementing steps and methods in the foregoing method embodiments are further provided. It is worth noting that the apparatus embodiments may be used in conjunction with the foregoing methods, and may also be independently used.

Figure 9:
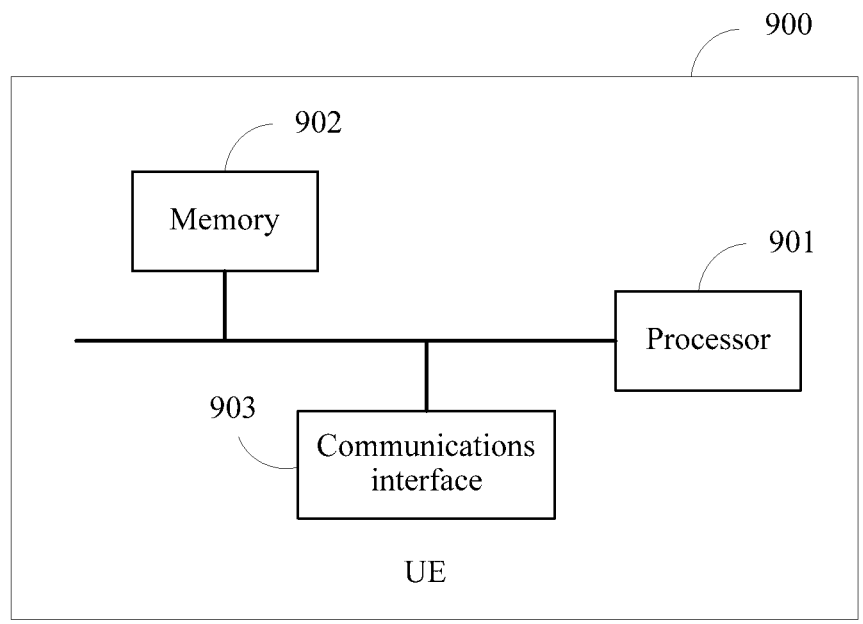
FIG. 9 is a schematic structural diagram of UE according to an embodiment of the present invention.

FIG. 9 is a schematic structural diagram of UE according to an embodiment of the present invention. As shown in FIG. 9, the UE 900 includes a processor 901, a memory 902, and a communications interface 903. The processor 901 is connected to the memory 902 and the communications interface 903. For example, the processor 901 may be connected to the memory 902 and the communications interface 903 by using a bus.

The processor 901 is configured to support the UE in executing corresponding functions in the foregoing method. The processor 901 may be a central processing unit (CPU), a network processor (NP), a hardware chip, or any combination thereof. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof.

The memory 902 is configured to store signaling and data that the UE needs to send, signaling and data received from an RAN device, and the like. The memory 902 may include a volatile memory, for example, a random access memory (RAM); the memory 902 may also include a non-volatile memory, for example, a read-only memory (ROM), a flash memory, a hard disk drive (HDD), or a solid-state drive (SSD); the memory 902 may further include a combination of the foregoing types of memories.

The communications interface 903 is configured to communicate with the RAN device, and receive and send, together with the RAN device, the signaling and data involved in the foregoing method.

The processor 901 may execute the following operations: sending uplink signaling and data and/or receiving downlink signaling and data by using the communications interface 903; sending a random access request and/or an RRC connection request for one or more network slices by using the communications interface 903; and receiving, by using the communications interface 903, a message including an access control parameter that is sent by the RAN device, and performing corresponding processing. For details, refer to the implementations in Embodiments 1 to 4.

Figure 10:
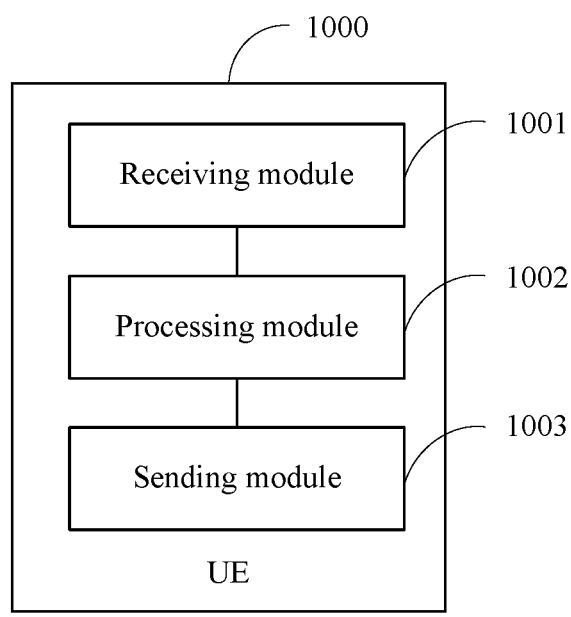
FIG. 10 is a schematic structural diagram of UE according to an embodiment of the present invention.

FIG. 10 is a schematic structural diagram of another UE according to an embodiment of the present invention. As shown in FIG. 10, the UE 1000 includes: a receiving module 1001, a processing module 1002, and a sending module 1003.

The receiving module 1001 is configured to receive an access control parameter, an RRC connection rejection message, an RRC connection release message, and the like that are sent by an RAN. The access control parameter and the message each include an identifier of one or more network slices.

The processing module 1002 is configured to perform corresponding processing based on the information received by the receiving module 1001. For specific processing, refer to the implementations in Embodiments 1 to 4.

The sending module 1003 is configured to send a random access request message, an RRC connection request message, and the like. The message includes the identifier of the one or more network slices.

Figure 11:
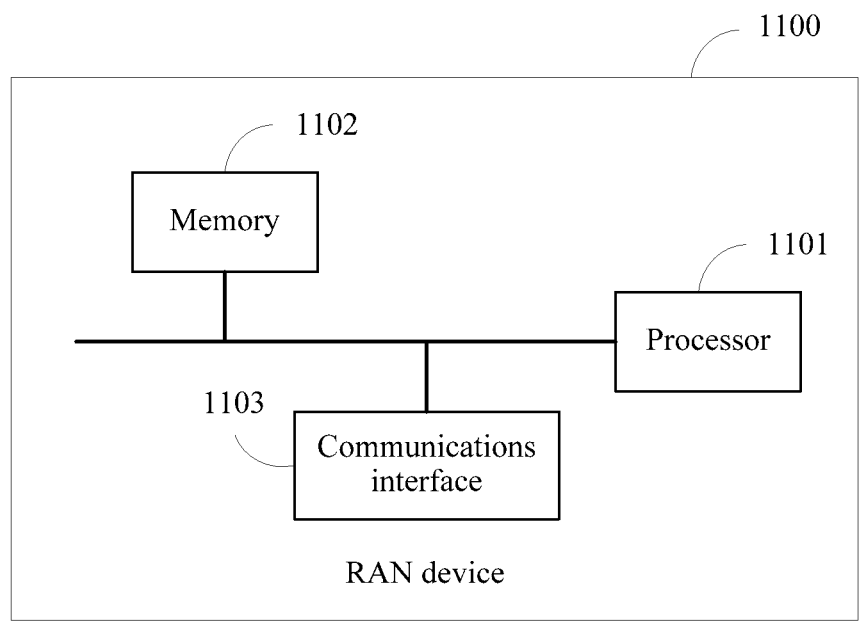
FIG. 11 is a schematic structural diagram of an RAN device according to an embodiment of the present invention.

FIG. 11 is a schematic structural diagram of an RAN device according to an embodiment of the present invention. As shown in FIG. 11, the RAN device 1100 includes a processor 1101, a memory 1102, and a communications interface 1103. The processor 1101 is connected to the memory 1102 and the communications interface 1103. For example, the processor 1101 may be connected to the memory 1102 and the communications interface 1103 by using a bus.

The processor 1101 is configured to support the RAN device in executing corresponding functions in the foregoing method. The processor 1101 may be a central processing unit (CPU), a network processor (NP), a hardware chip, or any combination thereof. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof.

The memory 1102 is configured to store signaling and data that the RAN device needs to send, signaling and data received from a CN device and UE, and the like. The memory 1102 may include a volatile memory, for example, a random access memory (RAM); the memory 1102 may also include a non-volatile memory, for example, a read-only memory (ROM), a flash memory, a hard disk drive (HDD), or a solid-state drive (SSD); the memory 1102 may further include a combination of the foregoing types of memories.

The communications interface 1103 is configured to communicate with the CN device and the UE, and receive and send, together with the CN device and the UE, the messages and data involved in the foregoing method.

The processor 1101 may execute the following operations:
sending signaling and data and/or receiving signaling and data by using the communications interface 1103; collecting statistics about resource usage of one or more network slices in the RAN device, and performing processing such as an adjustment or restoration on an access control parameter based on an indication that is received by the communications interface 1103 and sent by the CN device and/or based on a statistical result obtained by the RAN device; and responding, based on the processing result, to a message that is received by the communications interface 1103 and sent by the UE. For details, refer to the implementations in Embodiments 1 to 10.

Figure 12:
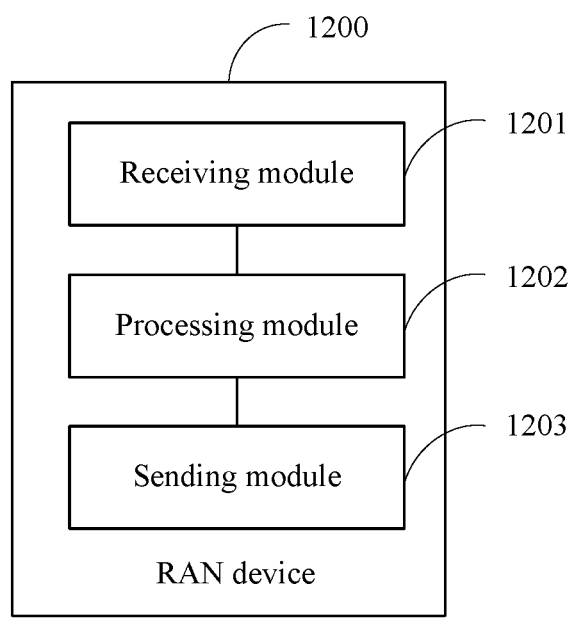
FIG. 12 is a schematic structural diagram of an RAN device according to an embodiment of the present invention.

FIG. 12 is a schematic structural diagram of another RAN device according to an embodiment of the present invention. As shown in FIG. 12, the RAN device 1200 includes: a receiving module 1201, a processing module 1202, and a sending module 1203.

The receiving module 1201 is configured to: receive an overload control indication, an overload control termination indication, an access control adjustment indication, and the like that are sent by a CN device, and receive a random access request message, an RRC connection request message, and the like that are sent by UE. The message may include an identifier of one or more network slices.

The processing module 1202 is configured to: collect statistics about resource usage of one or more network slices, and perform corresponding processing based on an indication that is received by the receiving module 1201 and sent by the CN device and/or based on a statistical result obtained by the RAN device. For specific processing, refer to the implementations in Embodiments 1 to 10.

The sending module 1203 is configured to send a system information message in a broadcast manner, where the system information message may include an access class control parameter, a random access channel resource, and the like; and is further configured to send one or more RRC connection rejection messages, one or more RRC connection release messages, and the like in a unicast manner. The message may include an identifier of one or more network slices.

Figure 13:
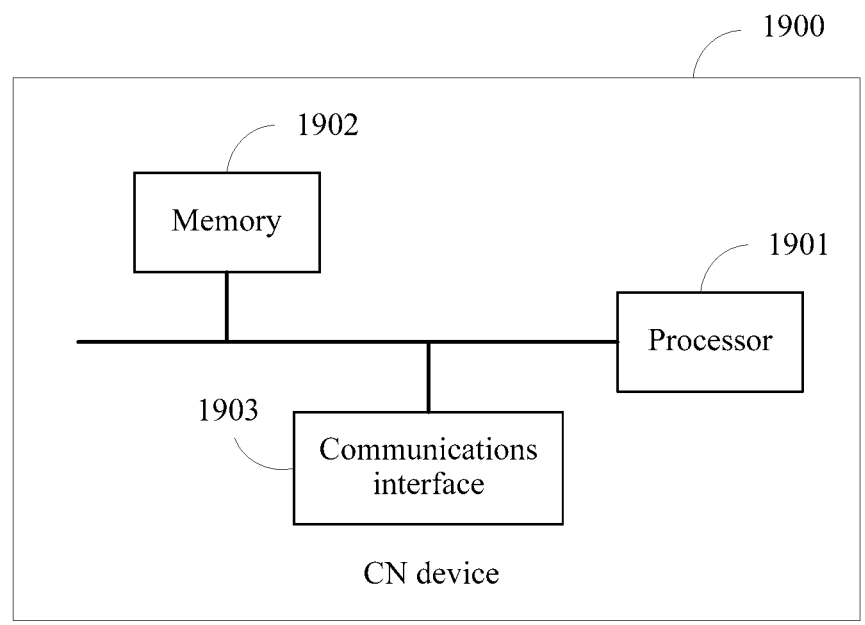
FIG. 13 is a schematic structural diagram of a CN device according to an embodiment of the present invention.

FIG. 13 is a schematic structural diagram of a CN device according to an embodiment of the present invention. As shown in FIG. 13, the CN device 1300 includes a processor 1301, a memory 1302, and a communications interface 1303. The processor 1301 is connected to the memory 1302 and the communications interface 1303. For example, the processor 1301 may be connected to the memory 1302 and the communications interface 1303 by using a bus.

The processor 1301 is configured to support the CN device in executing corresponding functions in the foregoing method. The processor 1301 may be a central processing unit (CPU), a network processor (NP), a hardware chip, or any combination thereof. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), generic array logic (GAL), or any combination thereof.

The memory 1302 is configured to store signaling and data that the CN device needs to send, signaling and data received from an RAN device, and the like. Further, the memory 1302 may store a QoS rule, a first QoS parameter configuration, and the like that are received from a core network QoS control function. The memory 1302 may include a volatile memory such as a random-access memory (RAM); the memory 1302 may include a non-volatile memory such as a read-only memory (ROM), a flash memory, a hard disk drive (HDD) or a solid-state drive (SSD); or the memory 1302 may include a combination of the foregoing memories.

The communications interface 1303 is configured to communicate with the RAN device, and receive and send, together with the RAN device, the messages and data involved in the foregoing method.

The processor 1301 may execute the following operations:

sending signaling and data by using the communications interface 1303; and initiating processing such as overload control, overload control termination, an access control parameter adjustment based on a resource status of the CN device. For details, refer to the implementations in Embodiments 5 to 7.

Figure 14:
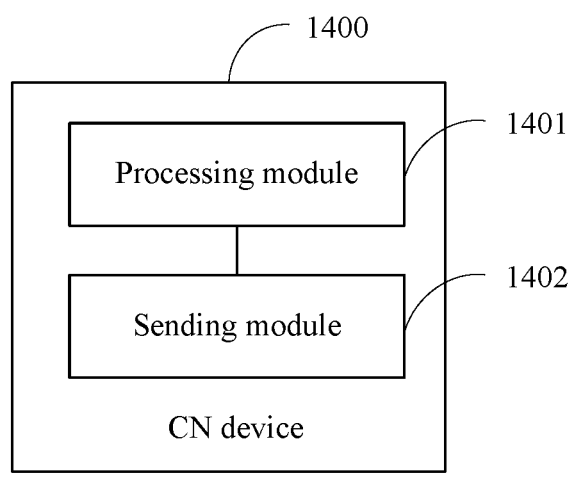
FIG. 14 is a schematic structural diagram of a CN device according to an embodiment of the present invention.

FIG. 14 is a schematic structural diagram of another CN device according to an embodiment of the present invention. As shown in FIG. 14, the CN device 1400 includes: a processing module 1401 and a sending module 1402.

The processing module 1401 is configured to: collect statistics about resource usage of one or more network slices in the CN device, and perform corresponding processing based on a statistical result. For specific processing, refer to the implementations in Embodiments 5 to 7.

The sending module 1402 is configured to send an overload control indication, an overload control termination indication, an access control adjustment indication, and the like to an RAN device based on a processing result obtained by the processing module 1401. The message may include an identifier of one or more network slices.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several indications for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network access control method, comprising:
   sending, by a core network device, an overload control indication to a radio access network device, wherein the overload control indication comprises an identifier of a network slice in a core network, the overload control indication indicates that the network slice is overloaded, and the overload control indication further comprises a load reduction level of the network slice;
   adjusting, by the radio access network device, an access class control parameter of the network slice based on the load reduction level of the network slice; and
   broadcasting, by the radio access network device, the adjusted access class control parameter to terminal devices through system information.

2. The method according to claim 1, wherein the access class control parameter comprises at least one of the following:
   an access class barring factor,
   an access class barring time,
   an access permission bit identifier, and
   an application type category.

3. The method according to claim 1, wherein the access class control parameter further comprises a public land mobile network (PLMN) identifier.

4. The method according to claim 1, wherein the overload control indication further comprises an overload level of the network slice.

5. A network access control system comprising a radio access network device and a core network device, wherein
   the radio access network device comprises:
     at least one processor;
     a transceiver coupled with the at least one processor and configured to communicate with other devices; and
     a non-transitory computer-readable storage medium coupled with the at least one processor and configured to store program instructions which, when being executed by the at least one processor, cause the radio access network device to:
       receive an overload control indication from a core network device, wherein the overload control indication comprises an identifier of a network slice in a core network, the overload control indication indicates that the network slice is overloaded, and the overload control indication further comprises a load reduction level of the network slice;
       adjust an access class control parameter of the network slice based on the load reduction level of the network slice; and
       broadcast the access class control parameter to terminal devices through system information; and
   the core network device comprises:
     at least one processor;
     a transceiver coupled with the at least one processor and configured to communicate with other devices; and
     a non-transitory computer-readable storage medium coupled with the at least one processor and configured to store program instructions which, when being executed by the at least one processor, cause the core network device to:
       send the overload control indication to the radio access network device.

6. The network access control system according to claim 5, wherein the access class control parameter comprises at least one of the following:
   an access class barring factor,
   an access class barring time,
   an access permission bit identifier, and
   an application type category.

7. The network access control system according to claim 5, wherein the access control parameter further comprises a PLMN identifier.

8. The network access control system according to claim 5, wherein the overload control indication further comprises an overload level of the network slice.

* * * * *